Aug. 4, 1942.  T. A. BOWERS  2,292,040

FABRICATED PISTON RING

Filed June 9, 1941  2 Sheets-Sheet 1

Inventor:
Thomas A. Bowers
By
Attorney

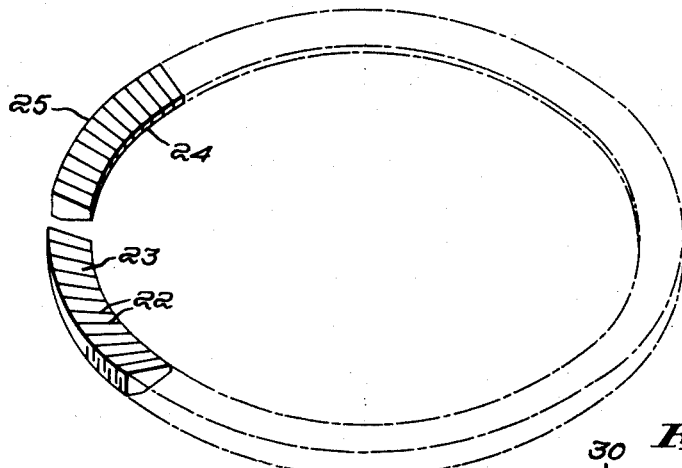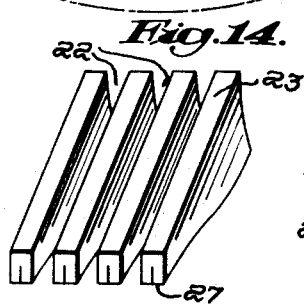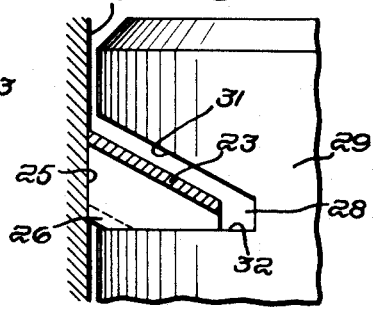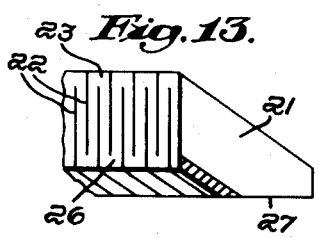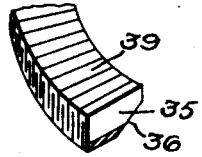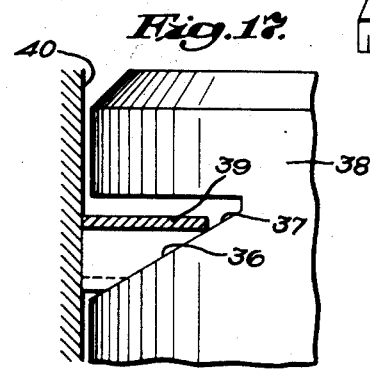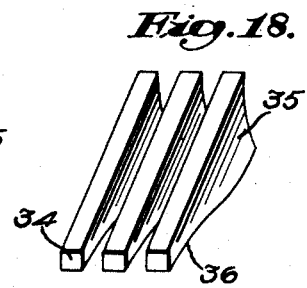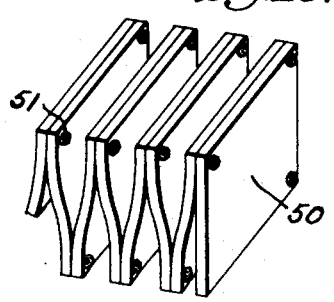

Patented Aug. 4, 1942

2,292,040

UNITED STATES PATENT OFFICE 2,292,040

FABRICATED PISTON RING

Thomas A. Bowers, Mattapoisett, Mass., assignor to Power Research Corporation, Boston, Mass., a corporation of Massachusetts Application June 9, 1941, Serial No. 397,167

14 Claims. (Cl. 309—45)

This invention relates to piston rings and is a continuation in part of my copending application, Ser. No. 288,147, filed October 3, 1939.

The chief object of the invention is to improve piston rings and to devise a fabricated ring structure having a plurality of sheets or walls connected together to provide a novel sealing member. Another object of the invention is to provide a piston ring which resists expansion by gas pressure, with a view to decreasing tapered cylinder wall wear. Another object of the invention is to provide improved sealing means in a ring of the type in which sheet metal is reversely folded upon itself. Another object of the invention is to provide a piston ring structure which is adapted to be distorted by gas pressure and in so doing to absorb a part of the gas pressure that is normally directed to expanding the piston ring. Another object of the invention is to provide a piston ring structure which includes portions adapted to be collapsed against one another and held in sealed relation by means of gas pressure. The invention also aims to provide a cheap, efficient, long-lived, easily installed piston ring, and generally to present an improved combination of a cylinder, piston and piston ring.

The nature of the invention, and its objects, will be more fully understood from the following description of the drawings and discussion relating thereto.

In the accompanying drawings:

Fig. 12 is a perspective view of another modified piston ring construction of the invention.

Fig. 13 is an enlarged fragmentary perspective view of the ring shown in Fig. 12.

Fig. 14 is an enlarged fragmentary perspective view of a piston ring in an extended position.

Fig. 15 is a view in elevation and partial cross section illustrating a ring, similar to that shown in Fig. 12, mounted in a cylinder and piston assembly.

Fig. 16 is a fragmentary perspective view of another modification of piston ring.

Fig. 17 is a view in elevation and partial cross section illustrating a ring similar to that shown in Fig. 16 mounted in a cylinder and piston.

Fig. 18 is an enlarged fragmentary perspective view of a ring in an extended position.

Fig. 19 is an enlarged fragmentary perspective view of still another modification of piston ring.

Figure 1:
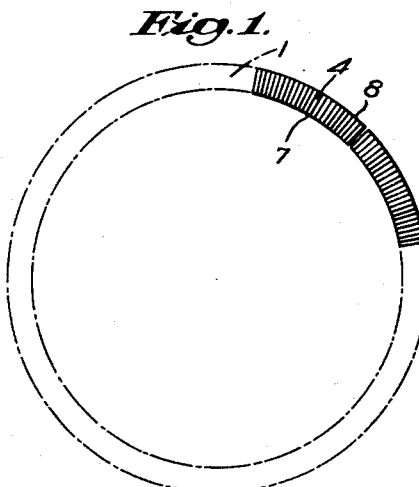
Fig. 1 is a plan view illustrating a piston ring of the invention.
Figure 2:
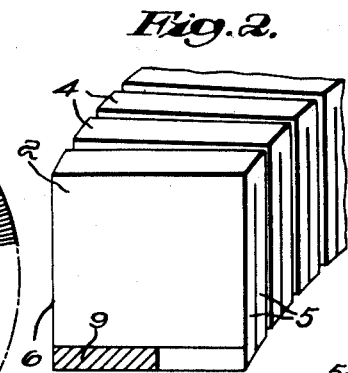
Fig. 2 is an enlarged fragmentary perspective view of a ring similar to that shown in Fig. 1.

In my earlier patents, No. 1,798,928, issued to me March 31, 1931, and No. 2,076,544, issued to me April 13, 1937, I have described and claimed novel piston ring structures fabricated from a strip of resilient sheet material. The strip is reversely folded upon itself and formed into an annular body in which occur a multiplicity of minute openings or interstices. The openings or interstices allow the folds of sheet material to be compacted upon one another, and the resilient character of the metal of which the folds are composed causes them to tend to spring apart from a compacted position. The ring operates with its ends in an abutting position and provides flexibility and uniformity of wall pressure which are greatly superior to flexibility and wall pressure obtainable from cast iron C-type rings.

A preferred embodiment of the ring of the present invention includes a reversely folded strip ring of the same general character as the rings of the above noted patents, with the difference that the strip is severed along points of folding throughout a portion of the radial width of the ring. This partial separation of the sheet material provides for a modified type of flexing and sealing action by the ring.

In the construction shown in the drawings, numeral 1 indicates a piston ring made up of a plurality of warped sheets or walls 2 of piston ring material, which extend axially of the ring and which are spaced apart a very small amount by interstices 3. The sheets 2 are secured together, along one side of the ring, by means of radially extending connecting portions or crowns 4, and along an opposite side by means of connecting portions or crowns 9, as may be more clearly seen in Figs. 2–8 inclusive. The connecting portions 4 and 9 are preferably of an axial thickness which is greater than the circumferential thickness of the sheets or walls 2.

The inner and outer edges 5 and 6 of the sheets 2 constitute respectively the inner periphery 7 and the outer periphery 8 of the ring, while the crowns 4 and 9 are formed with flattened tops and are arranged in contiguous relation to provide opposite seating surfaces of the ring (Fig. 1). In Figs. 2–8 inclusive the ring has been illustrated in an exaggerated extended position to show more clearly the exact arrangement of the sheets and connecting portions, and it should be understood that the edges of the sheets and the flattened connecting portions normally occur closely adjacent one another.

Figures 6, 9:
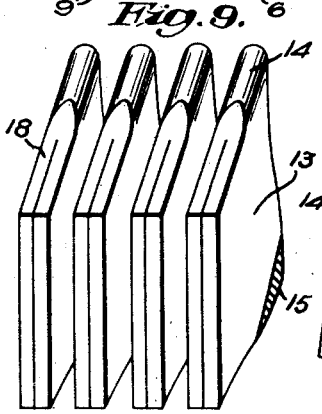
Fig. 6 is an enlarged fragmentary bottom plan view of the ring.
Fig. 9 is an enlarged fragmentary perspective view illustrating a modified ring construction of the invention.

The connecting portions along one side of the ring, as for example the connecting portions 9, are partially severed along lines of cutting which extend from the inner periphery of the ring throughout a substantial part of the radial length of the connecting portions, and the separated parts of the connecting portions 9 are spaced apart to provide reversely curved edges 9a and 9b. The connecting portions 9 throughout those portions which are not severed occur in spaced-apart relation in the usual manner as shown in Fig. 6.

Each pair of walls or sheets 2, included by a crown 4, has inner edges 5 lying in contact one with the other, and occurring in a substantially squarely disposed position with respect to the seating surfaces of the ring. Also, each of the outer edges 6 of walls 2 are spaced apart and occur in a reversely bent position, as may be more clearly seen in Fig. 4.

Normally, in a ring of reversely folded character, each of the connecting portions or crowns are spaced apart a uniform amount at both the top and bottom sides of a ring, and the walls or web portions extend between upper and lower connecting portions in a uniformly bent manner, to form a series of connected generally V-shaped enclosures open at both the inner and outer peripheries of the ring.

Figure 3:
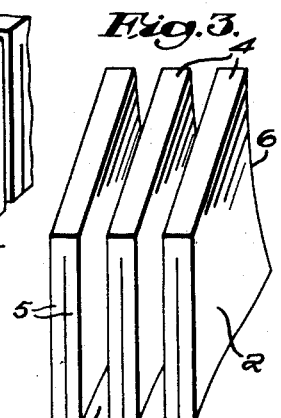
Fig. 3 is another enlarged fragmentary perspective view of the ring as viewed from a point inside thereof.
Figure 4:
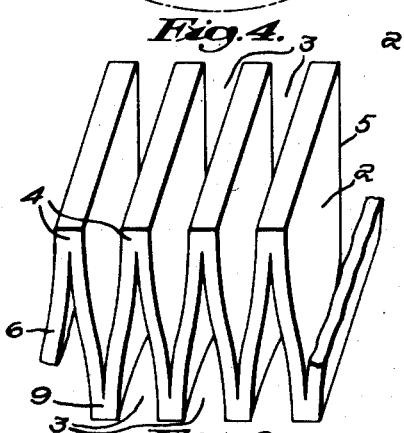
Fig. 4 is another enlarged fragmentary perspective view of the ring as viewed from a point outside thereof.
Figure 5:
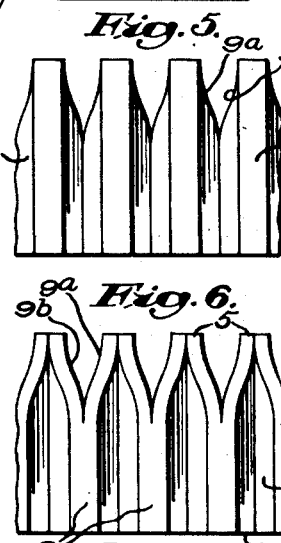
Fig. 5 is an enlarged fragmentary top plan view of the ring.

In a ring having partially severed crowns, however, the arrangement of the walls or sheets varies at different points in the ring. At the outer periphery of a partially severed ring, the walls 2 are uniformly spaced apart to provide minute V-shaped enclosures, as shown in Fig. 4. At the inner periphery of the ring, the walls 2 become rearranged in pairs, as noted above, with those walls of a respective pair remaining in contact with one another along their inner edges 5, and with each of the pairs of walls becoming spaced apart a slight amount (Fig. 3).

The arrangement of the walls in pairs is induced by the connecting portions 4 which tend to hold the sheets together, at the inner periphery of the ring, with a greater force than that exerted by the crowns 9 in their partially severed state. As a result the cut edges 9a and 9b of the crowns 9 open from the points at which the separation of the crowns terminates, and the inner edges of each pair of walls, included by a crown 4, are maintained in contact substantially throughout their axial length.

To compensate for the inner edges of each pair of walls included by a crown 4 being in contact, and for outer edges of such pairs being spaced apart at the outer periphery of the ring, the walls assume a warped or bent state diverging from a closed position to an open V-shaped position. This warped formation of the walls is inherent in a ring structure having connecting portions which are partially severed along one side of the ring. However, in the preferred embodiment of ring illustrated in Figs. 1–8, the walls are permanently warped by suitable treatment hereinafter described.

In operation in a piston, the ring functions as a gapless ring with its ends adapted to abut one another, and the usual practice is to employ a size of ring which is of a greater circumference than the circumference of the cylinder in which the ring is installed. By so doing, the ring is necessarily compacted in order to be installed in the cylinder and will thereafter tend to exert a radial pressure outwardly on a cylinder wall. This pressure allows the ring to conform to various irregularities in the cylinder walls surface, and at the same time to exert a uniform pressure all around the cylinder wall for every position of the piston in its cycle of movement in the cylinder. In addition, the warped form of the walls or sheets, in the compacted position of the ring noted, tends to develop additional resiliency and to hold portions of the sheets in contact with one another.

Figure 8:
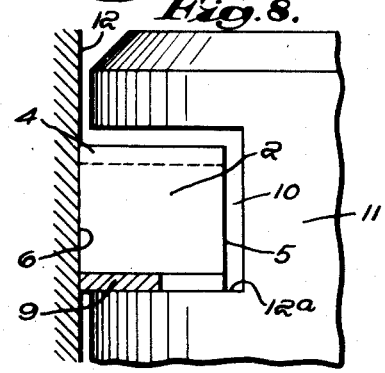
Fig. 8 is a side elevation and partial cross section of a cylinder and piston having the ring of the invention mounted therein.

In Fig. 8, I have illustrated a ring of the invention mounted in a piston groove 10 of a piston 11, and engaged in sealed relation with a cylinder wall 12. This arrangement prevents gases from passing axially between the cylinder and ring. The outer edges 6 of the ring bear against the cylinder wall 12 while the inner edges 5 constitute an inner periphery of the ring occurring in spaced relation to the inside of the piston groove 10.

The reversely bent edges 9a and 9b, together with the unsevered portions of the crowns 9, are adapted to engage in sealing contact with the side 12a of the piston ring groove, and they thus prevent passage of gases between the under side of the ring and the piston groove. As the ring is circumferentially extended or compacted during reciprocation in a cylinder, the sheets become distorted in varying amounts with the outer peripheral edges 6 of the walls 2 moving apart in continuously sealed relation on the cylinder, while the inner peripheral edges 5 tend to remain held against one another, also in sealed relation. By maintaining the edges 5 sealed together in pairs, gas is prevented from passing radially through interstices 3 which open at the under side of the ring. There are thus obtained three seals, i. e., between the ring and the cylinder; between the ring and the piston groove; and between the walls of the ring itself.

An important feature of the invention are partially severed connecting portions provided along at least one side of the ring, and the novel manner in which such a ring structure reacts upon exposure to fluctuating gas pressures. Conventional rings tend to become more tightly expanded against the top of a cylinder wall than at other points, due to combustion gas pressures being at their maximum while the piston is at the beginning of its downward stroke. This causes relatively great cylinder wear at the top of the cylinder and decreases the life of combustion motors.

In the ring of the invention the partially connected wall construction utilizes gas pressure to develop a resistance to expansion normally induced by such gas pressure. Gas pressure exerts a force uniformly in all directions and therefore exerts a force on the walls or sheets 2 in a direction circumferentially of the ring. Since the inner peripheral portions of the walls are secured together by connecting portions of usual radial length at the upper side of the ring and by partially severed crowns at the lower side of the ring, such pressure tends to force together each pair of walls included by crowns which are unchanged at the upper side of the ring. At the same time, the outer peripheral portions of the walls are held together by the unsevered crowns at both the upper and lower sides of the ring, and gas pressure tends to space each of the walls apart a uniform amount. Therefore the walls diverge from a substantially collapsed position at the inner periphery of the ring to a normally open and uncollapsed position at the outer periphery.

Collapsing of the walls in pairs, throughout a part of their radial length, tends to develop a contracting force in a direction circumferentially of the ring. Gas pressure on the ring, however, normally tends to force the outer peripheral portions of the walls apart. As a result collapsing of the walls opposes expansion of the ring by gas pressure. The contraction varies in accordance with the amount of pressure and therefore there is built up a variable resistance to fluctuating gas pressures which acts to reduce cylinder wear caused by such pressures.

The collapsing action of the ring when subjected to gas pressure may be increased by modifying the partially connected sheet construction to a point at which many variations in wall pressure in the ring may be obtained. One means of modifying the partially connected sheet construction consists in varying the angular disposition of adjacent sheets considered axially of the ring.

The ring of the invention provides for very efficient sealing with respect to gases moving radially of the ring. The inner edges of the sheets which lie against one another, in the manner described above, are adapted to be forced tightly together by combustion gas pressure. Gas pressure is thus prevented from passing between these sides and their sealed relation, under pressure, is independent of the size or number of the walls or sheets. It is possible therefore to use thicker sheet material and a less number of walls for a given ring size, and to cheapen the manufacture of such rings.

Still another important feature of the invention is the provision of permanently warped walls. It should be understood that partially connected walls may provide the contraction effect and sealing action above described, without being actually set in a warped form. Normally flat walls or sheets, upon being connected together by connecting portions which are partially severed along one side of the ring, will assume a warped or distorted position.

However, by making the walls 2 with a permanently warped formation, there is obtained added resiliency the warped form tends to urge each of the walls circumferentially apart from one another when held in a compacted position. A further feature of the permanently warped wall formation is the manner in which inner edges of the sheets are held in pairs, in sealed relation. The warped walls when compacted tend to become tightly pressed against one another, at their inner peripheral edges, independently of any gas pressure. Gas pressure on the permanently warped walls may, however, tend to improve the sealed relation of the inner edges of the warped walls.

Figure 7:
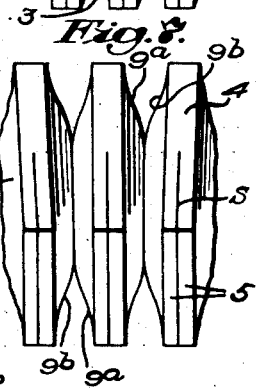
Fig. 7 is an inside fragmentary perspective view of the ring shown in a greatly enlarged form.

The permanently warped walls also may allow the ring to have its connecting portions severed partially along two sides instead of one, as for example in the manner illustrated in Fig. 7 in which the line S denotes a line of cutting of the crown portion 4. The advantage in utilizing a ring with partially severed crowns 4, as well as partially separated crowns 9, is that the ring may be more properly balanced, since there is the same relative amount of force tending to hold the walls together at the top side of the ring as at the bottom side. This balance may prevent the possible occurrence of dishing of the ring, in a manner such that the inner periphery is in a relatively higher or lower plane than the outer periphery of the ring.

One method of making a ring with a permanently warped wall structure consists in reversely bending a strip of resilient sheet metal in the manner described in my earlier patents above noted, and then forming a length of such reversely folded material into a ring.

Thereafter the bent portions of the reversely folded strip, corresponding to the crowns or connecting portions 4 already specified, are separated at one side of the ring by cuts which extend from the inner periphery of the ring throughout a portion of its radial width. The partially severed ring structure is then extended to a position in which the walls assume an exaggerated warped position.

In carrying out this stretching operation, the severed portions of the strip at one side of the ring move apart while the inner edges of the strip included by unsevered bent portions tend to remain in contact with one another. The result is for the sheets or walls to move apart, in a direction circumferentially of the ring, a greater amount at the outer periphery of the ring than at the inner periphery.

While the ring is in a stretched position with the walls thus warped or distorted, hardening is carried out, by some suitable means such as the use of heat, to set the resilient metal of which the walls are composed in the warped position noted. The ring is then subjected to necessary or desirable grinding or other finishing operations.

Figure 10:
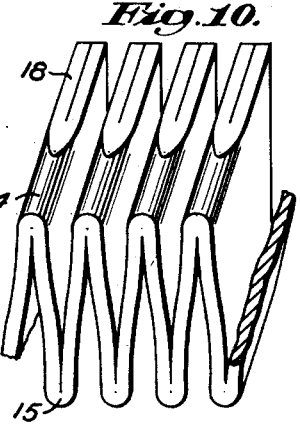
Fig. 10 is a view similar to Fig. 9 illustrating the ring modification as viewed from the outside.
Figure 11:
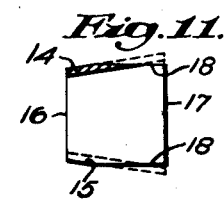
Fig. 11 is a detail view in cross section.

I may desire to incorporate the partially severed crown feature in other types of rings. For example, I may provide a reversely folded strip piston ring such as that illustrated in Figs. 9–11 inclusive. In the construction shown therein, numeral 13 refers to permanently warped walls or sheets connected together by connecting portions 14 and 15. The walls 13 are axially greater at the inner periphery 17 of the ring than at the outer periphery 16, and the connecting portions 14 and 15 extend between the inner and outer peripheries angularly with respect to the axis of the ring. Parts of the connecting portions 13 and 14 are removed as illustrated in Figs. 9–11, to provide parallel seating surfaces made up of severed edges 18. By thus removing connecting portions throughout a part of their radial length, the sheets or walls 13 become partially separated in the same manner as the walls 2 of the ring shown in Figs. 1–8 inclusive.

It is pointed out that in making piston rings of reversely bent sheet metal, of the type referred to in my earlier noted patents, it has been found desirable to flatten the connecting portions in order to secure suitably flat sides for sealing the ring in a piston groove, thus preventing passage of combustion gases and oil between the ring and a piston groove, at certain points in the operation of the ring. Such flattening tends to weaken the crowns, and it is desirable to increase the thickness of the metal at the bends so that they have an axial thickness greater than the circumferential thickness of the walls. Thickening the metal at the connecting portions increases the cost of making the rings.

An important advantage of a ring such as that shown in Figs. 9–11 inclusive, relates to improvements in providing flat seating surfaces in reversely folded rings. By removing parts of the connecting portions 14 and 15 of a wedge-shaped ring such as that shown in Figs. 9–11, adequate strength, combined with suitably flat parallel sides for seating the ring are obtained, without resorting to increasing the thickness of the metal at the bends or crown portions. As a result, very substantial savings in the making of the ring may be effected.

Various other modifications of rings having partially severed crowns may be resorted to, as for example, rings having portions removed to provide seating surfaces which are adapted to occur angularly with respect to the axis of a piston in which they are seated. For example, Figs. 12–15 inclusive illustrate a ring made up of walls 21 which extend axially of the ring and are spaced apart by interstices 22. The sheets 21 are secured together by means of connecting portions or crowns 23, which extend throughout the radial width of the ring at the upper side thereof as viewed in Figs. 12 and 15. Inner and outer edges of the sheets constitute respectively the inner periphery 24 and outer periphery 25 of the ring, while the crown portions 23 extend inwardly and downwardly with respect to the axis of the ring and constitute a sloping upper side as viewed in Figs. 1 and 2.

Numeral 26 denotes additional connecting portions for the sheets 21. These connecting portions extend inwardly from the outer periphery 25 throughout a portion only of the radial width of the ring, and in parallel relation to the connecting portions 23, to provide an under side of the ring as viewed in Figs. 1 and 2.

Still another side of the ring consists of a plurality of independently supported edges 27 which are the lowermost extremities of the sheets 21 as viewed in Figs. 13 and 15. These extremities of the sheets, referred to as edges 27, are formed so that they occur in a plane at right angles to the axis of the ring, thereby forming a seating surface adapted to engage against a piston groove side which occurs in a plane at right angles to the axis of its piston.

In Fig. 15 I have illustrated the ring mounted in a piston groove 28 of a piston 29, and in engagement with the cylinder wall 30. The piston groove 28 is formed with a side 31 which is angularly disposed with respect to the axis of the piston, and which coincides with the degree of angularity of the upper side of the ring, as viewed in Fig. 2. This allows the upper side of the ring to seat against the piston groove. The piston ring groove is also formed with a side 32 which extends in a plane at right angles to the axis of the piston, and upon which may be seated a side of the ring made up of the edges 27.

As viewed in Fig. 15, crown portions 26 preferably extend at the under side of the ring for a distance exceeding the normal spacing or clearance between the cylinder wall 30 and the outer edge of the piston ring groove 28. This results in the edges 27 throughout their radial length being maintained in contact with the sides 32 of the piston groove.

The ring in an exaggerated extended position has been illustrated in Fig. 14, and the resulting structure provides a seal in the three ways already noted in connection with the description of the ring first discussed in the specification. The action of the ring in sealing, resisting fluctuating pressures and in other respects is generally of the same character as that of the rings already noted. If desired, the walls may be formed with a permanently warped shape suitable for holding the inner edges 27 in a closed position with the walls in a spaced-apart position at the outer periphery.

I may also resort to other modifications of ring as for example the ring shown in Figs. 16, 17, and 18, consisting of a plurality of walls or sheets 35 and connecting portions 39. The ring has a lower seating surface which extends angularly with respect to the axis of the ring and includes a plurality of independently supported edges 36. When it is desired to use a ring of this character, it is intended that a piston ring groove construction will be resorted to, such as that shown in Fig. 17, in which a lower seating surface 37 is formed angularly with respect to the axis of the piston 38. It is pointed out that the outer periphery of the ring engages the cylinder wall 40 in the usual manner, and the edges of the walls 35 extend inwardly and form solid inner peripheral portions 34.

Still further modifications of piston rings may be formed in accordance with the invention, such as for example that shown in Fig. 19, in which a plurality of separate walls 50 are secured together by some suitable mechanical means such as welding 51, applied at various points in the ring structure, as for example has been illustrated in Fig. 19. It is pointed out that the welding 51 may secure inner edges of adjacent walls together at both their top and bottom sides, thus insuring proper sealing of the edges. Fig. 19 is intended to be particularly illustrative of a ring made up of a plurality of separate pieces of material secured together in a suitable manner for inducing a contraction effect and improved sealing either in the form of flat or permanently warped sheets. Various other means of fastening the sheets or walls may also be resorted to.

It will be observed that the ring of the invention presents novel collapsible and pressure compensating features, and also sealing effects. Means have been provided in rings of the flexible type, including a plurality of pieces of piston ring material resiliently supported in circumferentially movable relation and having upper and lower radially extending interstices, for closing those radially extending interstices which are more remote from the head of the piston and which connect with the space in the piston ring groove and the space between a cylinder and the piston. By utilizing sheets partly connected throughout their radial width, there is obtained very desirable elimination of wear on both cylinder walls and the ring itself, and this resistance to wear is particularly effective in high compression motors such as Diesel engines and the like. The reduction in wear makes possible substantial savings in oil consumption, reduces carbonization, and prevents loss of compression in combustion motors. A novel sealing action with respect to gases passing radially of a ring is provided and other advantages in connection with making sheet metal rings and in other respects are set forth.

While I have shown a preferred embodiment of the invention, it should be understood that various other changes and modifications may be resorted to, in keeping with the spirit of the invention as defined by the appended claims.

I claim:

1. As an article of manufacture, a piston ring comprising a plurality of walls secured one to another to form a split ring body, said walls having their inner peripheral edges associated together in pairs and their outer peripheral edges spaced apart to provide a series of V-shaped openings which extend radially of the ring and which are substantially closed by the said pairs of edges.

2. A piston ring comprising a plurality of warped walls, connecting portions for the walls extending radially along opposite sides of the ring, connecting portions at one side of the ring being severed along a part of their radial length, said walls being associated together in pairs to provide a series of interstices which are open at the outer periphery of the ring and which are closed at the inner periphery of the ring.

3. As an article of manufacture a piston ring comprising a plurality of walls, connecting portions for the walls extending radially at opposite sides of the ring, connecting portions along one side of the ring being severed along a part of their radial length, the severed portions of the connecting portions occurring in spaced-apart relation, those walls included by unsevered connecting portions having their inner peripheral edges associated together in pairs and each pair of inner peripheral edges of the walls being spaced apart from an adjacent pair.

4. A piston ring comprising a plurality of walls of piston ring material disposed on edge and secured together by connecting portions which extend radially along opposite sides of the ring, said walls being warped so that their outer peripheral portions are spaced apart a greater amount than other portions thereof and inner peripheral edges of the walls resiliently held in contact with one another in pairs.

5. A piston ring comprising a plurality of walls of piston ring material disposed on edge and secured together by connecting portions which extend radially along opposite sides of the ring, said walls being of a greater axial height at the inner periphery of the ring than at the outer periphery thereof, said connecting portions along opposite sides of the ring being partially removed to provide substantially flat parallel seating surfaces for the ring, and inner peripheral edges of the walls resiliently held in contact with one another in pairs.

6. A piston ring comprising a plurality of sheets disposed on edge and secured together by radially extending connecting portions at opposite sides of the ring, the connecting portions at one side of the ring occurring angularly with respect to the connecting portions at the other side of the ring to provide an annular body of generally wedge-shaped character, said connecting portions being removed at opposite sides of the ring along a part of their radial width to partially separate the sheets and provide parallel flat seating surfaces for the ring, and inner peripheral edges of the sheets lying in contact with one another in circumferentially spaced-apart pairs.

7. A piston ring comprising a plurality of sheets of piston ring material disposed on edge in closely compacted relation, means for securing the sheets together, each sheet having two of its edges secured to an adjacent sheet at one side thereof and a third edge secured to another adjacent sheet at an opposite side thereof.

8. A piston ring comprising a plurality of sheets of piston ring material disposed on edge, each of said sheets being secured to an adjacent sheet along two edges and to another adjacent sheet along one edge.

9. A piston ring comprising a plurality of walls of piston ring material disposed on edge, connecting means for securing edges of the walls, said walls together being arranged in spaced-apart relation to provide V-shaped upper and lower interstices, which extend radially of the ring, inner peripheral edges of walls forming the said lower interstices being resiliently held together.

10. As an article of manufacture a piston ring comprising a plurality of sheets secured one to another, edges of the walls occurring at the inner and outer peripheries of the ring, the edges at the outer periphery being spaced apart to provide a series of connected V's, edges at the inner periphery of the ring lying in contact with other edges at the inner periphery to provide circumferentially spaced-apart pairs.

11. As an article of manufacture a piston ring comprising a plurality of walls secured one to another to form a split ring body, said walls arranged in pairs and lying in contact with one another throughout a part of the radial width of the ring, the outer peripheral edges of the walls being spaced apart to provide a series of V-shaped openings.

12. As an article of manufacture a piston ring comprising a plurality of walls secured one to another to form a split ring body, the walls being separated from one another throughout a part of the radial width of the ring thereby to provide arrangement of portions of the walls in circumferentially spaced-apart pairs.

13. As an article of manufacture a piston ring comprising a plurality of walls of piston ring material, connecting portions for the walls at the upper and lower sides of the ring, the connecting portions at the lower side of the ring being interrupted to extend from the outer periphery of the ring throughout a part only of its radial width, inner peripheral edges of the walls lying in contact with one another in pairs, each of the walls of respective pairs being included by the connecting portions at the said upper side of the ring, the outer peripheral edges of the walls being spaced apart to provide a series of V-shaped openings.

14. As an article of manufacture a piston ring comprising a plurality of walls of piston ring material, connecting portions of the walls at the upper and lower sides of the ring, the connecting portions at the lower and upper sides of the ring being interrupted to extend from the outer periphery of the ring throughout a part only of its radial width, inner peripheral edges of the walls lying in contact with one another in pairs, the outer peripheral edges of the walls being spaced apart to provide a series of V-shaped openings.

THOMAS A. BOWERS.